(12) United States Patent
Hirose et al.

(10) Patent No.: US 12,424,620 B2
(45) Date of Patent: Sep. 23, 2025

(54) NEGATIVE ELECTRODE ACTIVE MATERIAL, NEGATIVE ELECTRODE AND METHOD FOR PRODUCING THEM

(71) Applicant: SHIN-ETSU CHEMICAL CO., LTD., Tokyo (JP)

(72) Inventors: Takakazu Hirose, Annaka (JP); Reiko Sakai, Takasaki (JP); Yusuke Osawa, Annaka (JP); Takumi Matsuno, Annaka (JP); Kohta Takahashi, Takasaki (JP); Katsunori Nishiura, Chiba (JP); Nan Fang, Ichihara (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 715 days.

(21) Appl. No.: 17/642,302

(22) PCT Filed: Jul. 16, 2020

(86) PCT No.: PCT/JP2020/027582
§ 371 (c)(1),
(2) Date: Mar. 11, 2022

(87) PCT Pub. No.: WO2021/053951
PCT Pub. Date: Mar. 25, 2021

(65) Prior Publication Data
US 2022/0336800 A1    Oct. 20, 2022

(30) Foreign Application Priority Data
Sep. 18, 2019    (JP) .................. 2019-169865

(51) Int. Cl.
*H01M 4/48* (2010.01)
*H01M 4/04* (2006.01)
*H01M 4/02* (2006.01)

(52) U.S. Cl.
CPC ........... *H01M 4/48* (2013.01); *H01M 4/0402* (2013.01); *H01M 2004/021* (2013.01); *H01M 2004/027* (2013.01)

(58) Field of Classification Search
CPC .............. H01M 4/48; H01M 4/0402; H01M 2004/021; H01M 2004/027
(Continued)

(56) References Cited

U.S. PATENT DOCUMENTS 5,395,711 A   3/1995   Tahara et al.
6,183,718 B1  2/2001   Barker et al.
(Continued)

FOREIGN PATENT DOCUMENTS

CN   1351767 A    5/2002
CN   105917499 A  8/2016
(Continued)

OTHER PUBLICATIONS

Jun. 20, 2023 Office Action issued in Japanese Patent Application No. 2019-169865.
(Continued)

*Primary Examiner* — Jonathan G Leong
*Assistant Examiner* — Kevin Nguyen
(74) *Attorney, Agent, or Firm* — Oliff PLC

(57) ABSTRACT

A negative electrode active material including negative electrode active material particles, wherein the negative electrode active material particles contain silicon compound particles containing a silicon compound, the silicon compound particles contain $Li_2SiO_3$, at least a part of a surface of the silicon compound particles is covered with a carbon layer, and a surface layer of the negative electrode active material particles contains a substance having a carboxylic acid structure. Provided by this configuration is a negative electrode active material capable of increasing battery
(Continued)

capacity due to improved initial efficiency and capable of realizing satisfactory battery cycle characteristics.

8 Claims, 5 Drawing Sheets

(58) Field of Classification Search
USPC .................................................. 429/231.95
See application file for complete search history.

(56) References Cited

U.S. PATENT DOCUMENTS

| | | | |
|---|---|---|---|
| 7,459,236 | B2 | 12/2008 | Konishiike et al. |
| 8,377,592 | B2 | 2/2013 | Jeong et al. |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2014/0162123 | A1 | 6/2014 | Fukuoka et al. |
| 2016/0233484 | A1 | 8/2016 | Hirose et al. |
| 2017/0040599 | A1 | 2/2017 | Kamo et al. |
| 2017/0149050 | A1 | 5/2017 | Hirose et al. |
| 2018/0090750 | A1 | 3/2018 | Oh et al. |
| 2018/0151873 | A1 | 5/2018 | Matsuno et al. |
| 2019/0051897 | A1* | 2/2019 | Kamo ................... H01M 4/483 |
| 2019/0123353 | A1 | 4/2019 | Hirose et al. |
| 2020/0028152 | A1 | 1/2020 | Hirose et al. |
| 2020/0199345 | A1 | 6/2020 | Yamauchi et al. |
| 2021/0028447 | A1 | 1/2021 | Takahashi et al. |

FOREIGN PATENT DOCUMENTS

| | | | | |
|---|---|---|---|---|
| EP | 3 306 711 | A1 | | 4/2018 |
| EP | 3 407 409 | A1 | | 11/2018 |
| JP | H06-325765 | A | | 11/1994 |
| JP | H09-190819 | A | | 7/1997 |
| JP | 2001-185127 | A | | 7/2001 |
| JP | 2002-042806 | A | | 2/2002 |
| JP | 2006-114454 | A | | 4/2006 |
| JP | 2006-164954 | A | | 6/2006 |
| JP | 2007-234255 | A | | 9/2007 |
| JP | 2008-177346 | A | | 7/2008 |
| JP | 2008-251369 | A | | 10/2008 |
| JP | 2008-282819 | A | | 11/2008 |
| JP | 2009-070825 | A | | 4/2009 |
| JP | 2009-205950 | A | | 9/2009 |
| JP | 2009-212074 | A | | 9/2009 |
| JP | 2011-192453 | A | | 9/2011 |
| JP | 2013-008696 | A | | 1/2013 |
| JP | 2014-135267 | A | | 7/2014 |
| JP | 2015-156328 | A | | 8/2015 |
| JP | 2015-156355 | A | | 8/2015 |
| JP | 2016-009550 | A | | 1/2016 |
| JP | 2016-066529 | A | | 4/2016 |
| JP | 2017-147055 | A | | 8/2017 |
| JP | 2017152375 | A | * | 8/2017 ........... C01B 33/325 |
| JP | 2018-006190 | A | | 1/2018 |
| JP | 2018-067555 | A | | 4/2018 |
| JP | 2018-206560 | A | | 12/2018 |
| JP | 2019-029297 | A | | 2/2019 |
| KR | 101586816 | B1 | | 1/2016 |
| KR | 10-2016-0110380 | A | | 9/2016 |
| KR | 10-2018-0014710 | A | | 2/2018 |
| TW | 201817062 | A | | 5/2018 |
| TW | 201906917 | A | | 2/2019 |

OTHER PUBLICATIONS

Apr. 3, 2024 Extended European Search Report issued in European Patent Application No. 20864831.1.
Jun. 18, 2024 Office Action issued in Japanese Patent Application No. 2019-169865.
Jun. 24, 2024 Office Action issued in Chinese Patent Application No. 202080064818.3.
Nov. 28, 2023 Office Action Issued in Chinese Patent Application No. 202080064818.3.
Dec. 4, 2023 Office Action Issued in Taiwanese Patent Application No. 109124505.
Mar. 22, 2023 Office Action issued in Japanese Patent Application No. 2019-169865.
Battery Association of Japan, Newsletter "Denchi (battery)", May 1, 2010, p. 10.
Hohl, A. et al., "An interface clusters mixture model for the structure of amorphous silicon monoxide (SiO)," Journal of Non-Crystalline Solids, vol. 320, pp. 255-280, 2003.
Kapaklis, V., "Structural characterization of silicon nanocrystals from amorphous silicon oxide materials," Journal of Non-Crystalline Solids, vol. 354, pp. 612-617, 2008.
Miyachi, M. et al., "Electrochemical Properties and Chemical Structures of Metal-Doped SiO Anodes for Li-Ion Rechargeable Batteries," Journal of the Electrochemical Society, vol. 154, No. 4, pp. A376-A380, 2007.
Yamada, M. et al., "Reaction Mechanism of "SiO"-Carbon Composite-Negative Electrode for High-Capacity Lithium-Ion Batteries," Journal of the Electrochemical Society, vol. 159, No. 10, pp. A1630-A1635, 2012.
Kim, T. et al., "Solid-State NMR and Electrochemical Dilatometry Study on Li+ Uptake/Extraction Mechanism in SiO Electrode," Journal of the Electrochemical Society, vol. 154, No. 12, pp. A1112-A1117, 2007.
Kim, H.J. et al., "Controlled Prelithiation of Silicon Monoxide for High Performance Lithium-Ion Rechargeable Full Cells," Nano Letters, vol. 16, pp. 282-288, 2016.
Sep. 15, 2020 International Search Report issued in International Patent Application No. PCT/JP2020/027582.
Mar. 15, 2022 International Preliminary Report on Patentability issued in International Patent Application No. PCT/JP2020/027582 .
Mar. 26, 2025 Office Action issued in Korean Patent Application No. 10-2022-7008345.

* cited by examiner

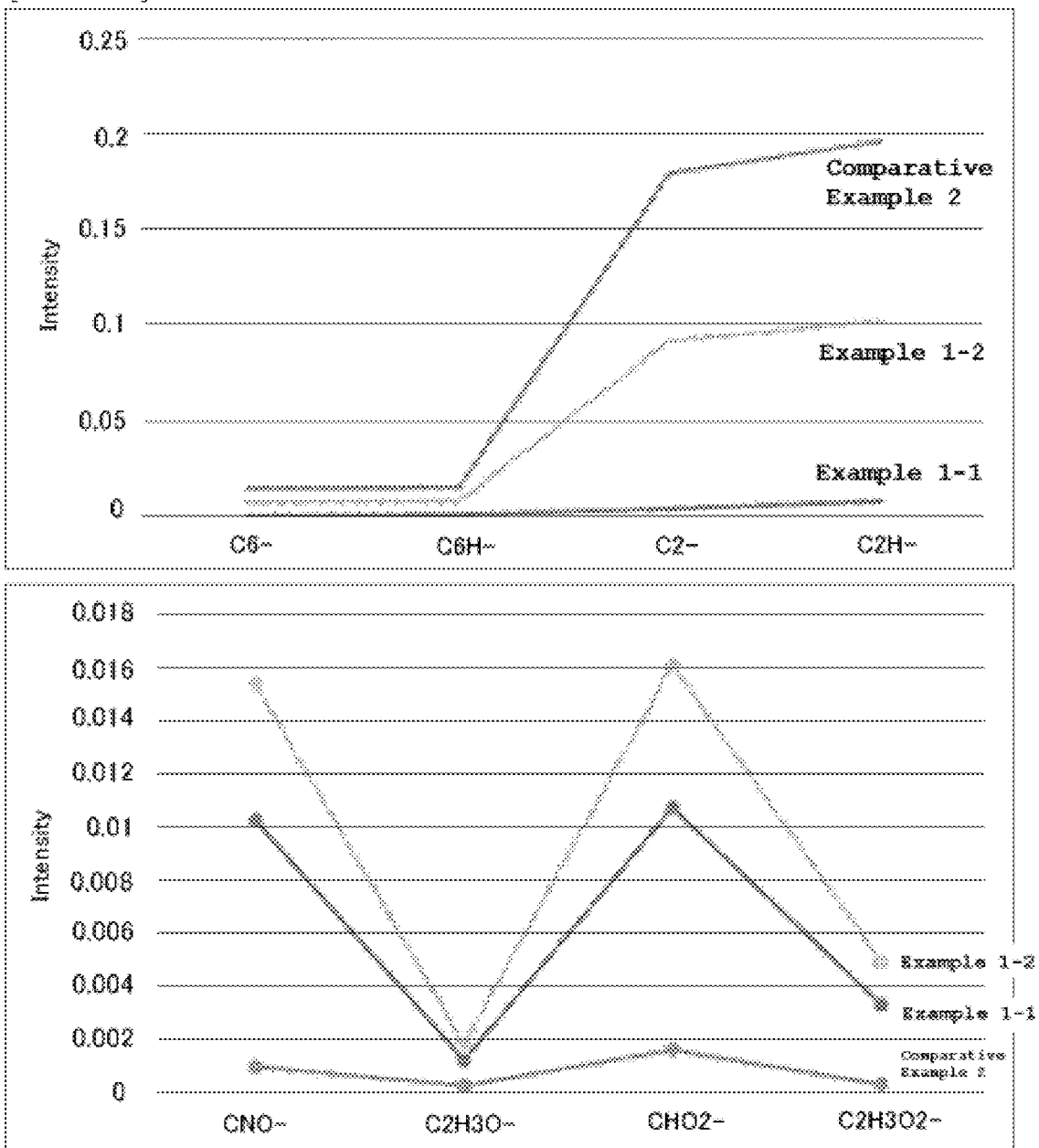

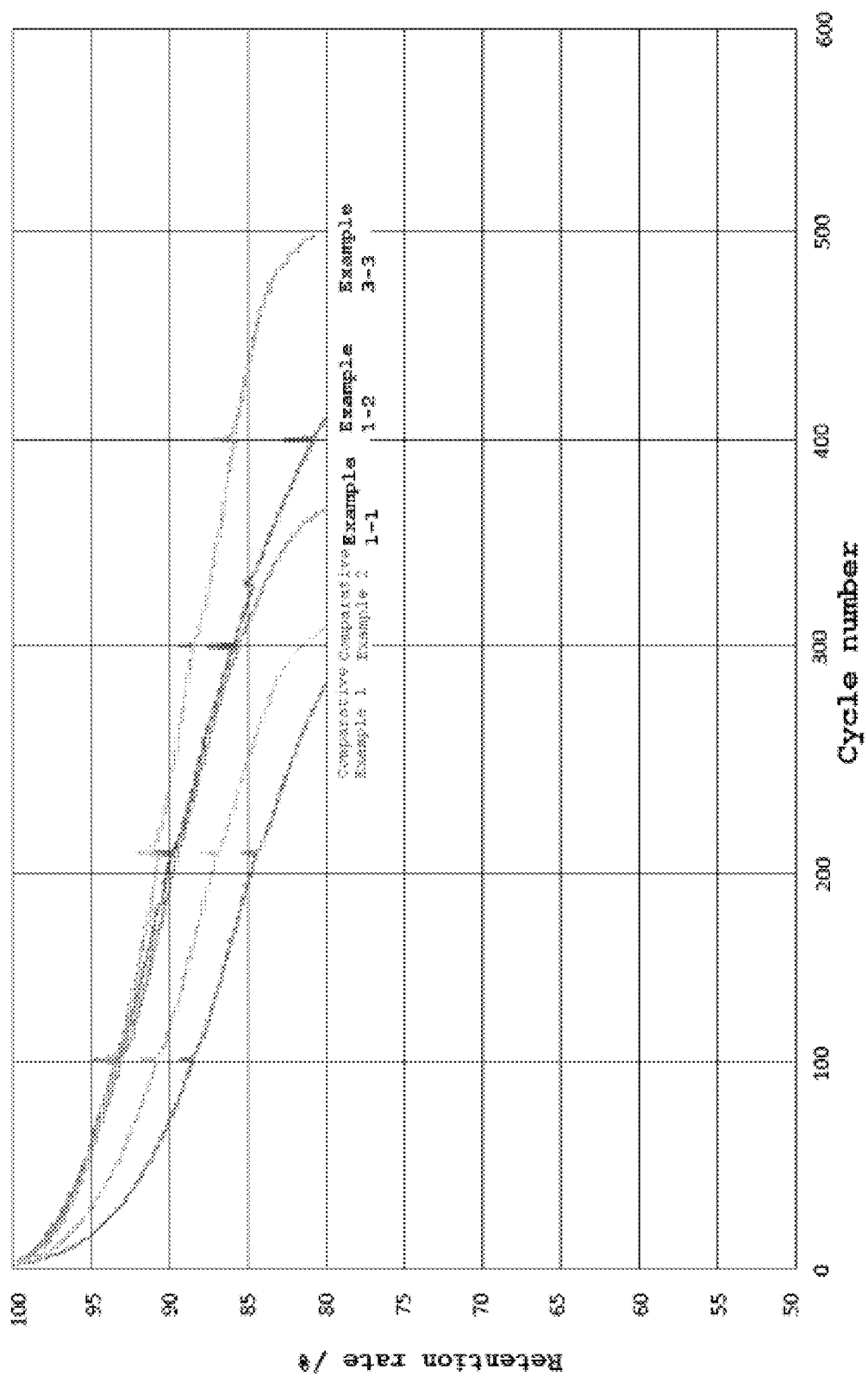
[FIG. 2]

[FIG. 3]
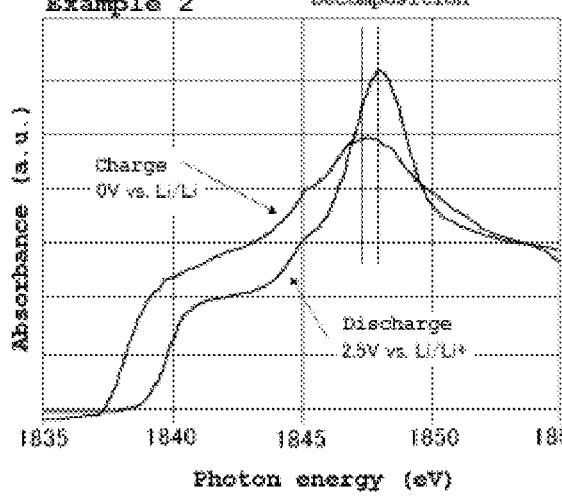
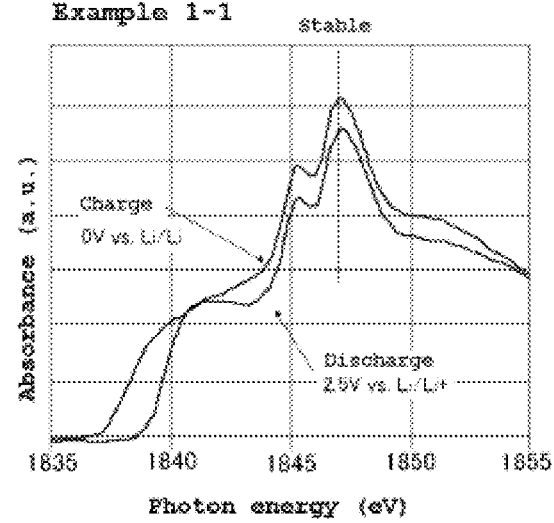
[FIG. 4]
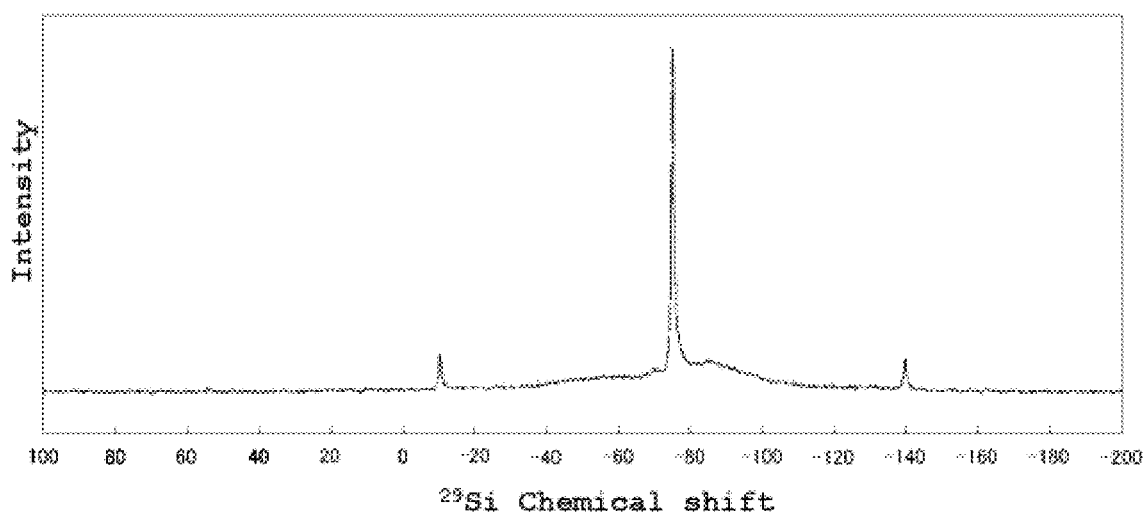

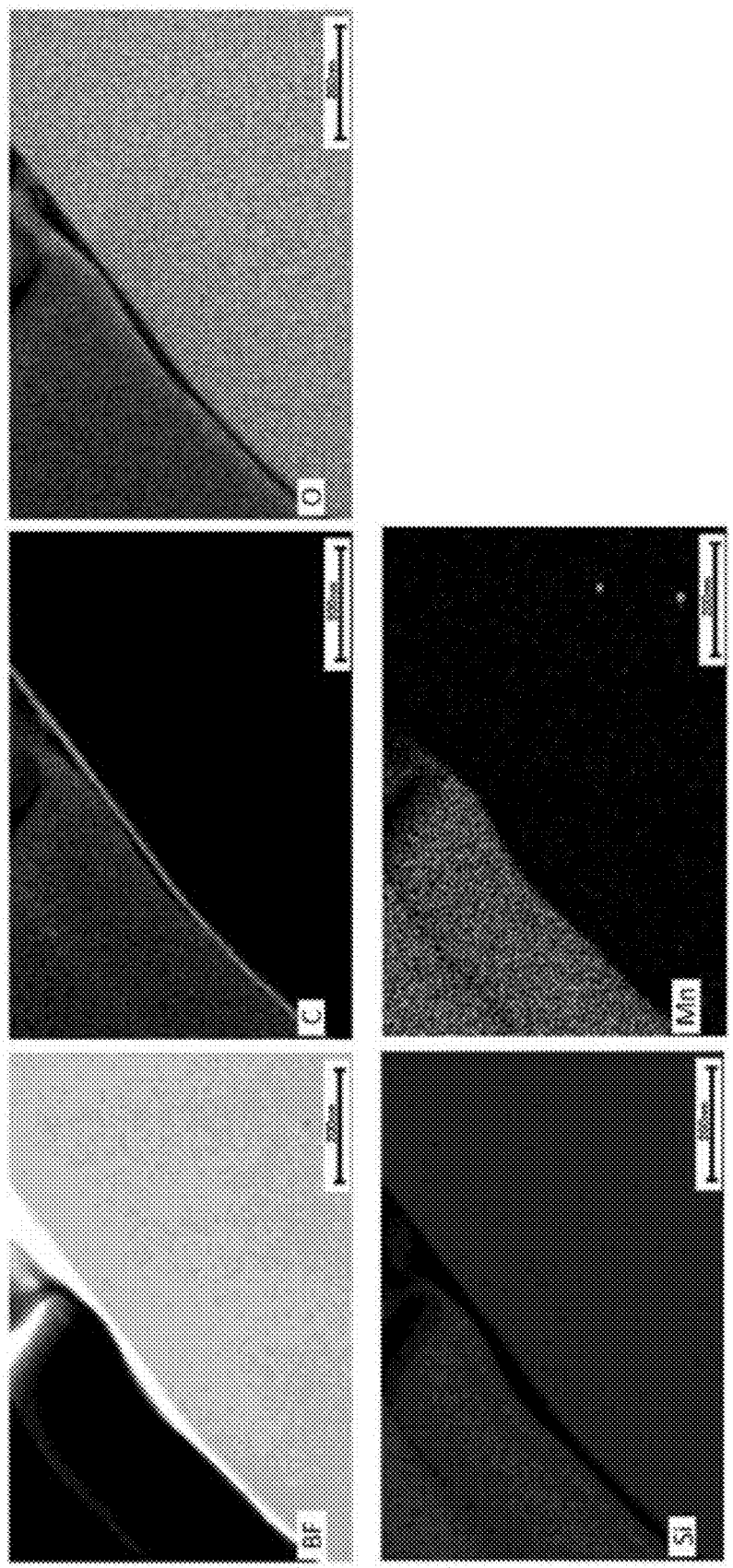
[FIG. 5]

[FIG. 6]
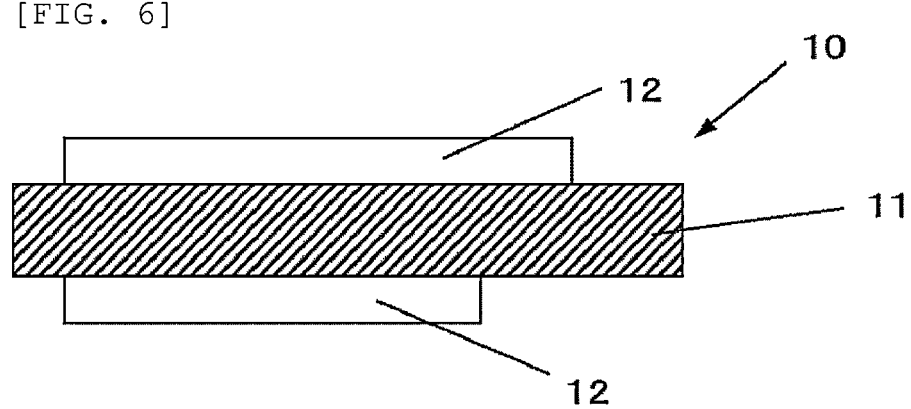
[FIG. 7]
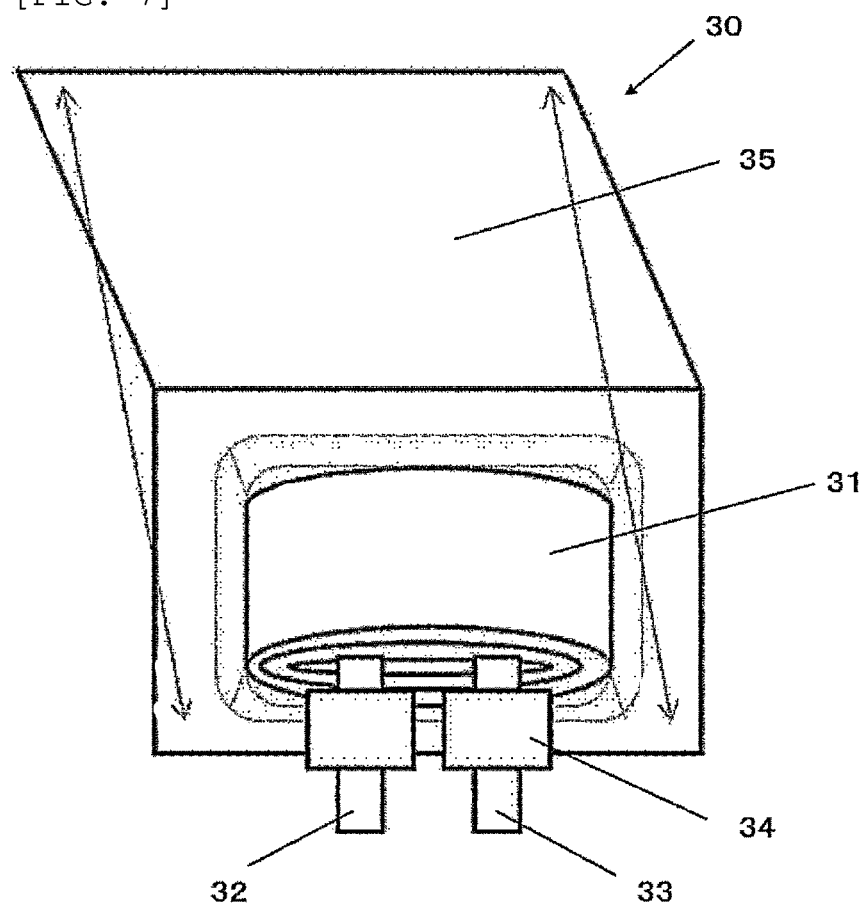

NEGATIVE ELECTRODE ACTIVE MATERIAL, NEGATIVE ELECTRODE AND METHOD FOR PRODUCING THEM

TECHNICAL FIELD

The present invention relates to a negative electrode active material, a negative electrode, and a method for producing them.

BACKGROUND ART

In recent years, small electronic devices, represented by mobile terminals, have been widely used and urgently required to reduce the size and weight and to increase the life. Such market requirements have advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon-based active material, is required to further improve the battery capacity for recent market requirements. Use of silicon as a negative electrode active material is considered to improve the battery capacity, for silicon has a theoretical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes ranges from an application type, which is standard for carbon materials, to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle characteristics easy to reduce.

Various materials and configurations of a negative electrode for a lithium-ion secondary battery mainly using a silicon material have been considered to improve the initial efficiency and the cycle characteristics of the battery.

Specifically, a vapor deposition method is used to accumulate silicon and amorphous silicon dioxide simultaneously so that better cycle characteristics and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle characteristics and higher input-output performance are achieved (See Patent Document 3, for example). Moreover, silicon active material is formed so as to contain oxygen with an average content of 40 at % or less and with a higher oxygen content near a current collector so that improved cycle characteristics is achieved (See Patent Document 4, for example).

Moreover, a nano-complex including Si-phase, $SiO_2$, $M_yO$ metal oxide is used to improve the first charge and discharge efficiency (See Patent Document 5, for example). To improve the cycle characteristics, $SiO_x$ ($0.8 \leq x \leq 1.5$, the range of particle size=1 µm to 50 µm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle characteristics are achieved (See Patent Document 7, for example). Moreover, a metal oxide containing lithium is used to improve the battery load characteristic (See Patent Document 8, for example). To improve the cycle characteristics, a hydrophobic layer such as a silane compound layer is formed on the surface of a silicon material (See Patent Document 9, for example). Moreover, a silicon oxide is used and coated with graphite coating to give electric conductivity so that improved cycle characteristics are achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, particles having a silicon microcrystal phase dispersed in a silicon dioxide are used to achieve a higher battery capacity and improved cycle characteristics (See Patent Document 11, for example). Moreover, a silicon oxide having a silicon-to-oxygen atomicity ratio of 1:y ($0 < y < 2$) is used to improve overcharge and overdischarge performance (See Patent Document 12, for example).

Further, as lithium-ion secondary battery using silicon oxide, Hitachi Maxell, Ltd. has started shipping prismatic secondary batteries for smart phone which employ nano-silicon composite, since June in 2010 (see Non Patent Document 1, for example). Silicon oxide proposed by Hohl is in the form of a composite material with $Si^{0+}$ to $Si^{4+}$ having various oxidation states (Non Patent Document 2). Moreover, Kapaklis has proposed a disproportionation structure in which silicon oxide is converted into Si and $SiO_2$ by receiving heat load (Non Patent Document 3).

Miyachi et al. have focused on Si and $SiO_2$, which contribute to charge and discharge, in silicon oxide having disproportionation structure (Non Patent Document 4). Yamada et al. have proposed a reaction equation between silicon oxide and Li as follows (Non Patent Document 5).

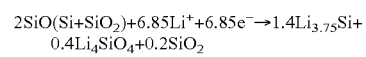

$$2SiO(Si+SiO_2)+6.85Li^++6.85e^- \rightarrow 1.4Li_{3.75}Si+0.4Li_4SiO_4+0.2SiO_2$$

In the reaction equation, Si and $SiO_2$ constituting silicon oxide react with Li, so that the starting material is converted and separated into Li silicide, Li silicate, and partially-unreacted $SiO_2$.

The resulting Li silicate is irreversible; once formed, it is a stable substance and does not release Li. The capacity per mass calculated from this reaction equation has a value close to experimental values, and the reaction equation is recognized as the reaction mechanism of silicon oxide. In Kim et al., irreversible component, Li silicate, in charging and discharging of silicon oxide has been identified in the form of $Li_4SiO_4$ by employed $^7Li$-MAS-NMR and $^{29}Si$-MAS-NMR (Non Patent Document 6).

The most disadvantageous aspect of silicon oxide is the irreversible capacity, and the improvement has been demanded. Hence, Kim et al. have greatly improved the initial battery efficiency by employed a prelithiation method in which Li silicate is formed in advance, and prepared a negative electrode applicable to actual uses (Non Patent Document 7).

Furthermore, instead of the method of doping an electrode with Li, there has been proposed a method of treating a powder to improve the irreversible capacity (Patent Document 13).

CITATION LIST

Patent Literature

Patent Document 1: JP 2001-185127 A
Patent Document 2: JP 2002-042806 A
Patent Document 3: JP 2006-164954 A
Patent Document 4: JP 2006-114454 A
Patent Document 5: JP 2009-070825 A
Patent Document 6: JP 2008-282819 A
Patent Document 7: JP 2008-251369 A
Patent Document 8: JP 2008-177346 A
Patent Document 9: JP 2007-234255 A
Patent Document 10: JP 2009-212074 A
Patent Document 11: JP 2009-205950 A
Patent Document 12: JP H06-325765 A
Patent Document 13: JP 2015-156355 A

NON PATENT LITERATURE

Non Patent Document 1: Battery Association of Japan, Newsletter "Denchi (battery)", May 1, 2010, p. 10 Non Patent Document 2: A. Hohl, T. Wieder, P. A. van Aken, T. E. Weirich, G. Denninger, M. Vidal, S. Oswald, C. Deneke, J. Mayer, and H. Fuess: J. Non-Cryst. Solids, 320, (2003), 255.
Non Patent Document 3: V. Kapaklis, J. Non-Crystalline Solids, 354 (2008) 612
Non Patent Document 4: Mariko Miyachi, Hironori Yamamoto, and Hidemasa Kawai, J. Electrochem. Soc. 2007 volume 154, issue 4, A376-A380
Non Patent Document 5: M. Yamada, A. Inaba, A. Ueda, K. Matsumoto, T. Iwasaki, T. Ohzuku, J. Electrochem. Soc., 159, A1630 (2012)
Non Patent Document 6: Taeahn Kim, Sangjin Park, and Seung M. Oh, J. Electrochem. Soc. volume 154, (2007), A1112-A1117.
Non Patent Document 7: Hye Jin Kim, Sunghun Choi, Seung Jong Lee, Myung Won Seo, Jae Goo Lee, Erhan Deniz, Yong Ju Lee, Eun Kyung Kim, and Jang Wook Choi,. Nano Lett. 2016, 16, 282-288.

SUMMARY OF INVENTION

Technical Problem

As described above, small electronic devices, represented by mobile devices, have been advancing recently toward high performance and multifunction, and a lithium-ion secondary battery that is main electric source thereof is required to increase the battery capacity. As a technique to solve this problem, it is desired to develop a lithium-ion secondary battery containing a negative electrode using a silicon material as a main material. Moreover, such a lithium-ion secondary battery using a silicon material is desired to have initial charge-discharge characteristics and cycle characteristics almost equivalent to those of a lithium-ion secondary battery using a carbon-based active material. Accordingly, the cycle characteristics and initial charge-discharge characteristics have been improved by using a negative electrode active material that is silicon oxide modified by insertion and partial release of Li. However, it was discovered that the generated Li silicate repeats decomposition and generation with charging and discharging. As a result, the capacity was reduced at the initial stage of the charge-discharge cycle, and the decomposition of the electrolyte in the surface layer was promoted, so that the battery characteristics were not sufficient.

The present invention has been made in view of the above problems, and an object of the present invention is to provide a negative electrode active material capable of increasing battery capacity and achieving sufficient battery cycle characteristics with improvement in initial efficiency. Another object of the present invention is to provide a negative electrode for a non-aqueous electrolyte secondary battery containing such a negative electrode active material.

Solution to Problem

In order to solve the above object, the present invention provides a negative electrode active material including negative electrode active material particles, wherein the negative electrode active material particles contain silicon compound particles containing a silicon compound, the silicon compound particles contain $Li_2SiO_3$, at least a part of a surface of the silicon compound particles is covered with a carbon layer, and a surface layer of the negative electrode active material particles contains a substance having a carboxylic acid structure.

Since the negative electrode active material of the present invention (hereinafter, also referred to as a silicon based negative electrode active material) contains negative electrode active material particles containing silicon compound particles (hereinafter, also referred to as silicon based negative electrode active material particles), the battery capacity can be improved. Further, since the silicon compound particles contain a Li compound that is stable against charge and discharge, the first time efficiency (also referred to as initial efficiency) can be improved when they are used as a negative electrode active material of a secondary battery. Further, by coating with the carbon conductive layer, conductivity is imparted, and the surface layer of the negative electrode active material particles containing a substance having a carboxylic acid structure in order to suppress the reaction with the electrolyte. Thereby, sufficient cycle characteristics (also referred to as battery cycle characteristics) can be realized.

At this time, it is preferable that the negative electrode active material particles have a negative fragment derived from a carboxylic acid structure detected by measurement by TOF-SIMS (time-of-flight secondary ion mass spectrometry).

If it is such a substance, a substance having a carboxylic acid structure can be contained in a sufficient amount in the surface layer of the negative electrode active material particles.

Further, the negative electrode active material is such that a spectral intensity of $Si^{x+}$ (0<x<4) of a negative electrode containing the negative electrode active material after charging is higher than that of the negative electrode after discharging in a spectrum of K absorption edge XANES of Si obtained from the XAFS measurement of the negative electrode taken out from a charged secondary battery, and the negative electrode taken out from the charged secondary battery after complete discharge, and in the XANES spectrum of the negative electrode after the charge spectral intensity of $Si^{x+}$ (2≤x<4) is higher than spectral intensity of $Si^{x+}$ (0<x<2).

In such a case, a high valence Si compound of $Si^{2+}$ and $Si^{3+}$ contributes to charging/discharging as a main active material, and stable battery characteristics can be realized.

In this case, the negative electrode active material has a peak attributable to $Li_2SiO_3$ in the Si K absorption edge XANES spectrum of the negative electrode after the charging and the discharging, and the position of the peak does not change.

With such a thing, $Li_2SiO_3$ can be formed more reliably and sufficiently. Since the $Li_2SiO_3$ component is stable during charging and discharging, the initial efficiency can be improved more reliably.

Further, the silicon compound particles preferably contain metal particles having a size of 10 nm or less inside the particles.

When the silicon compound particles contain the metal particles as a metal component inside the particles, the diffusion of Li ions in the bulk can be promoted.

Further, it is preferable that the metal particles have a lower vapor pressure than that of the silicon compound.

In such a case, the metal particles are more reliably contained inside the silicon compound particles.

Further, the negative electrode active material particles have a median diameter of 4.0 μm or more and 12 μm or less.

When the negative electrode active material particles have a median diameter of 4.0 μm or more, reaction with electrolyte can be suppressed and degradation of battery characteristics can be suppressed. Further, when it is 12 μm or less, expansion of the active material due to charging/discharging can be eased and loss of electronic contacts due to electrode deformation or the like can be suppressed.

Further, the average thickness of the carbon layer is preferably 5 nm or more and 500 nm or less.

When the average thickness of the carbon layer is 5 nm or more, sufficient conductivity can be obtained and it is easy to handle as a battery material. Further, when it is 500 nm or less, the stability is good and the reduction of the merit of the silicon oxide that improves the battery capacity can be suppressed.

The present invention also provides a negative electrode characterized by containing the above-mentioned negative electrode active material.

With such a negative electrode, when this negative electrode is used as the negative electrode of a lithium-ion secondary battery, the battery capacity and initial efficiency can be improved, and sufficient cycle characteristics can be obtained.

Further, the present invention provides a method for producing a negative electrode active material containing negative electrode active material particles including the steps of: producing silicon compound particles containing a silicon compound, coating at least a part of the silicon compound particles with a carbon layer, inserting Li into the silicon compound particles to make the silicon compound particles contain $Li_2SiO_3$, and making a surface layer of the negative electrode active material particles contain a substance having a carboxylic acid structure by performing surface modification of the negative electrode active material particles containing the silicon compound particles coated with the carbon layer.

With such a method for producing a negative electrode active material, when the manufactured negative electrode active material is used as the negative electrode active material of a secondary battery, the battery capacity can be increased, and the cycle characteristics and the initial charge-discharge characteristics can be improved.

Further, the present invention provides a method for producing a negative electrode containing negative electrode active material particles including the steps of: producing silicon compound particles containing a silicon compound, coating at least a part of the silicon compound particles with a carbon layer, forming a negative electrode containing the silicon compound particles coated with the carbon layer, inserting Li into the silicon compound particles contained in the formed negative electrode and making the silicon compound particles contain $Li_2SiO_3$, and making a surface layer of the negative electrode active material particles contained in the negative electrode contain a substance having a carboxylic acid structure by performing surface modification of the negative electrode active material particles containing the silicon compound particles coated with the carbon layer.

With such a negative electrode manufacturing method, when the manufactured negative electrode is used as the negative electrode of a lithium-ion secondary battery, the battery capacity can be increased, and the cycle characteristics and the initial charge-discharge characteristics can be improved.

Advantageous Effects of Invention

When the negative electrode active material of the present invention is used as the negative electrode active material of a secondary battery, high initial efficiency, high capacity, and high cycle characteristics can be obtained. Moreover, a secondary battery according to the present invention containing this negative electrode active material can be produced industrially advantageously, and has favorable battery capacity and first time charge-discharge characteristics. Further, the same effects can also be obtained from electronic devices, electric tools, electric vehicles, power storage systems, and so on which use the secondary battery of the present invention.

Further, according to the method for producing a negative electrode active material of the present invention, a negative electrode active material having a high capacity and good initial charge-discharge characteristics when used as a negative electrode active material of a secondary battery while obtaining favorable cycle characteristics can be manufactured.

BRIEF DESCRIPTION OF DRAWINGS

FIG. 1 shows results of TOF-SIMS analysis of the surface layer portion of the negative electrode active material particles of Examples 1-1 and 1-2 and Comparative Example 2.

FIG. 2 shows battery cycle characteristics of Examples 1-1, 1-2, 3-3, and Comparative Examples 1 and 2.

FIG. 3 shows results of analysis of changes in Li silicate associated with charging/discharging by the XAFS method in Examples 1-1 and Comparative Example 2.

FIG. 4 shows a $^{29}$Si-MAS-NMR spectrum obtained from the negative electrode active material of Example 1-3.

FIG. 5 shows results of transmission electron microscope measurement of the state of metals scattered inside the negative electrode active material particles of Example 1-1.

FIG. 6 is a cross-sectional view showing an example of the configuration of the negative electrode of the present invention.

FIG. 7 is an exploded view showing an example of the configuration of the lithium-ion secondary battery (laminated film type) of the present invention.

DESCRIPTION OF EMBODIMENTS

Hereinafter, embodiments of the present invention will be described, but the present invention is not limited thereto.

As described above, as a technique to increase the battery capacity of lithium-ion secondary battery, there has been investigated the use of a negative electrode mainly made from silicon oxide as a negative electrode for lithium-ion secondary battery. Such a lithium-ion secondary battery using silicon oxide is desired to have initial charge-discharge characteristics almost equivalent to those of a lithium-ion secondary battery using a carbon-based active material. Further, in the Li doped SiO that can improve the initial charge-discharge characteristics, it is desired that the cycle characteristics are close to those of the carbon-based active material. However, it has not reached to propose a negative electrode active material that provides initial charge-discharge characteristics equivalent to those of a carbon-based active material and exhibits cycle characteristics equivalent to those of a carbon-based active material, when used as a negative electrode active material for a lithium-ion secondary battery.

Therefore, the present inventors have repeated diligent studies in order to obtain a negative electrode active material that can improve the initial charge-discharge characteristics while obtaining high cycle characteristics, and can increase the battery capacity when used as the of the secondary battery, and as a result, have been reached the present invention.

[Negative Electrode Active Material of the Present Invention]

The negative electrode active material of the present invention contains negative electrode active material particles, and the negative electrode active material particles contain silicon compound particles containing a silicon compound, and the silicon compound particles contain $Li_2SiO_3$. Further, at least a part of the surface of the silicon compound particles is coated with a carbon layer, and the negative electrode active material particles contain a substance having a carboxylic acid structure in the outermost layer thereof (for example, coated or attached).

Since the negative electrode active material of the present invention contains negative electrode active material particles containing silicon compound particles, the battery capacity can be improved. Further, since the silicon compound particles contain a Li compound ($Li_2SiO_3$) that is stable against charge and discharge, the initial efficiency can be improved when used as a negative electrode active material of a secondary battery.

Further, by coating with the carbon conductive layer, conductivity is imparted, and the surface layer of the negative electrode active material particles contains a substance having a carboxylic acid structure in order to suppress the reaction with the electrolyte. As a result, sufficient cycle characteristics can be realized. Since the substance having a carboxylic acid structure has excellent binding property to the binder, it is positively bound to the binder at the stage of the slurry. As a result, the binder covers the material, the reaction area between the negative electrode active material and the electrolyte is reduced, and the reaction between the negative electrode active material and the electrolyte can be suppressed.

The substance having a carboxylic acid structure is not particularly limited as long as it has a carboxyl group, and acetic acid, formic acid or the like can be mentioned as examples thereof.

Further, it is preferable that the negative electrode active material particles of the present invention are those in which a negative fragment derived from a carboxylic acid structure is detected by measurement by TOF-SIMS. If it is such a substance, a substance having a carboxylic acid structure can be contained in a sufficient amount in the surface layer of the negative electrode active material particles.

Further, it is preferable that the negative electrode active material is such that a spectral intensity of $Si^{x+}$ ($0<x<4$) of a negative electrode containing the negative electrode active material after charging is higher than that of the negative electrode after discharging in a spectrum of Si K absorption edge XANES obtained from the XAFS measurement of the negative electrode taken out from a charged secondary battery, and the negative electrode taken out from the charged secondary battery after complete discharge, and in the XANES spectrum of the negative electrode after the charge spectral intensity of $Si^{x+}$ ($2 \leq x < 4$) is higher than spectral intensity of $Si^{x+}$ ($0 < x < 2$).

In the Si K absorption edge XANES (X-ray absorption near edge structure) spectrum obtained from XAFS (X-ray absorption fine structure) measurement, the amount of $Si^{x+}$ ($0<x<4$) changes with charging and discharging, and if the peak of Li silicate close to $Si^{4+}$ ($Si^{x+}$ ($2 \leq x < 4$)) existing near 1845.5 eV on the high energy side is strongly generated after charging, high valence Si compound like $Si^{2+}$, $Si^{3+}$ as the main active material contributes to charging and discharging. These $Si^{x+}$ ($2 \leq x < 4$) Si compounds are stable oxides, and by charging and discharging them, the battery characteristics can be dramatically improved.

Further, it is preferable that the $Li_2SiO_3$ component is sufficiently generated in advance in the negative electrode active material. Since this component is stable during charging and discharging, it is important to sufficiently form it from the beginning. The presence of the $Li_2SiO_3$ component can be confirmed by XRD (X-ray diffraction) and $^{29}$Si-MAS-NMR, but more preferably, it is confirmed by $^{29}$Si-MAS-NMR. In the present invention, it is particularly preferable that the position and intensity of the peak attributed to $Li_2SiO_3$ do not change.

Further, the negative electrode active material of the present invention has a peak attributable to $Li_2SiO_3$ in the Si K absorption edge XANES spectrum of the negative electrode after charging and discharging, and the position of the peak is preferably unchanged.

With such a thing, $Li_2SiO_3$ can be formed more reliably and sufficiently. Since the $Li_2SiO_3$ component is stable during charging and discharging, the initial efficiency can be improved more reliably.

Further, in the negative electrode active material of the present invention, it is preferable that the crystallite size of the Si microcrystal portion of the silicon compound particles does not increase. Specifically, it is preferable to enlarge the $Li_2SiO_3$ component while keeping the crystallite size at 3 nm or less because it is effective in improving the battery cycle characteristics and reducing the capacity at the initial stage of the cycle.

Further, the silicon compound particles of the present invention preferably contain metal particles having a size of 10 nm or less inside the particles. This makes it possible to promote the diffusion of Li ions into the bulk. The metal particle component preferably has a lower vapor pressure than the SiO gas, and for example, Mn, Cu, Cr, or the like is preferable. The content of the metal particles is preferably 1 mass ppm or more and 500 mass ppm or less with respect to the silicon compound particles. These metal particles can be confirmed by measuring with a transmission electron microscope (TEM) and performing elemental analysis using EDX (Energy Dispersive X-ray spectroscopy), but the confirmation method can be a method other than the above.

Further, it is desirable that the median diameter of the negative electrode active material particles is 4.0 μm or more and 12 μm or less. When the median diameter of the negative electrode active material particles is 4.0 μm or more, the reaction with the electrolyte can be suppressed and the deterioration of the battery characteristics can be suppressed. Further, when the diameter is 12 μm or less, the expansion of the active material due to charging-discharging can be eased, and the loss of electronic contacts can be suppressed. More preferably, it is 5.0 μm or more and 10 μm or less.

The thickness of the carbon layer coated on the surface layer of the negative electrode active material is preferably 5 nm or more and 500 nm or less. When the average thickness of the carbon layer is 5 nm or more, sufficient conductivity can be obtained and it is easy to handle as a battery material. Further, when it is 500 nm or less, the stability is favorable and the reduction of the merit of the silicon oxide that improves the battery capacity can be suppressed. A more desirable range is about 7 to 100 nm, more preferably about 10 to 80 nm.

<Negative Electrode for Non-Aqueous Electrolyte Secondary Battery>

First, the negative electrode (negative electrode for non-aqueous electrolyte secondary batteries) will be described. FIG. 6 is a cross-sectional view showing an example of the configuration of the negative electrode of the present invention.

[Configuration of Negative Electrode]

As shown in FIG. 6, the negative electrode 10 is constituted to have the negative electrode active material layer 12 on the negative electrode current collector 11. This negative electrode active material layer 12 may be disposed on the both sides or only one side of the negative electrode current collector 11. When the inventive negative electrode active material is used, the negative electrode current collector 11 is not essential.

[Negative Electrode Current Collector]

The negative electrode current collector 11 is made of a highly electric conductive and mechanically strong material. Examples of the electric conductive material used for the negative electrode current collector 11 include copper (Cu) and nickel (Ni). This electric conductive material is preferably a material that does not form an intermetallic compound with lithium (Li).

The negative electrode current collector 11 preferably contains carbon (C) and sulfur (S) besides the main element because these elements improve the physical strength of the negative electrode current collector. In particular, when the negative electrode has an active material layer that expands in charging, the current collector containing the above elements can prevent deformation of an electrode including the current collector. Each content of the contained elements is not particularly limited, but is preferably 100 ppm by mass or less. Since this improves effect of preventing deformation. Such effect of preventing deformation further improves the cycle characteristics.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 contains the inventive negative electrode active material, which is capable of occluding and releasing lithium ions. In view of battery design, other materials may be further contained, such as a negative electrode binding agent (binder) or a conductive assistant agent. The negative electrode active material contains negative electrode active material particles, and the negative electrode active material particles contain silicon compound particles containing a silicon compound containing oxygen.

The negative electrode active material layer 12 may contain a mixed negative electrode active material that contains the inventive negative electrode active material (silicon-based negative electrode active material) and a carbon-based active material. This makes it possible to decrease the electric resistance of the negative electrode active material layer and to ease the expanding stress due to charging. As the carbon-based active material, pyrolytic carbons, cokes, glassy carbon fiber, baked organic polymer compounds, and carbon black are usable.

Further, the inventive negative electrode active material contains silicon compound particles as described above. The silicon compound particles are each a silicon oxide material containing an oxygen-containing silicon compound. This silicon compound preferably contains silicon and oxygen as SiOx in a ratio within $0.5 \leq x \leq 1.6$. When "x" is 0.5 or more, the oxygen proportion is higher than that of silicon single substance, making the cycle characteristics favorable. When "x" is 1.6 or less, the resistance of silicon oxide is not too high and is preferable. Particularly, in the composition of SiOx, "x" is preferably close to 1 because higher cycle characteristics are obtained. Note that the composition of the silicon compound in the present invention does not necessarily mean purity of 100%, and may contain a small quantity of impurity elements.

Further, in the negative electrode active material of the present invention, the silicon compound particles contain a Li compound. More specifically, the silicon compound particles contain $Li_2SiO_3$. Because the $SiO_2$ component part which is destabilized at the time of insertion and desorption of lithium in the silicon compound at the time of charging-discharging of the battery is modified into another lithium silicate in advance and the irreversible capacity occurring at the time of charging can be reduced. Further, it is preferable to enlarge the Li silicate within a range in which crystal growth of Si is suppressed, and this makes it possible to more effectively reduce the irreversible capacity associated with charging-discharging. Further, by adhering a substance having a carboxylic acid structure to the surface layer portion of the negative electrode active material particles, it is possible to suppress the decomposition of the electrolyte due to charge-discharge and obtain a high charge-discharge cycle. Further, in the method for producing a negative electrode containing a negative electrode active material of the present invention, by performing the step of forming a negative electrode containing silicon compound particles coated with a carbon layer, after that, Li is inserted into the silicon compound particles contained in the negative electrode, the step of incorporating $Li_2SiO_3$ into the silicon compound particles and the step of the surface modification of the negative electrode active material particles containing the silicon compound particles coated with the carbon layer, a substance having a carboxylic acid structure is adhered on the surface layer of the negative electrode active material particles, decomposition of the electrolyte due to charging-discharging can be suppressed, and a high charging-discharging cycle can be obtained.

Further, $Li_2SiO_3$ inside the bulk of the silicon compound particles can be quantified by NMR (Nuclear Magnetic Resonance). The NMR measurement can be performed, for example, under the following conditions.

$^{29}$Si-MAS-NMR (magic angle spinning Nuclear Magnetic Resonance)
Apparatus: a 700-NMR spectroscope made by Bruker Corp.,
Probe: a 4-mm HR-MAS rotor, 50 μL,
Sample Spinning Speed: 10 kHz,
Measurement Environment Temperature: 25° C.

Further, the valence of the Si component in the silicon compound particles and $Li_2SiO_3$ inside the bulk can be confirmed by the spectrum in the XANES (X-ray absorption near edge structure) region of XAFS (X-ray absorption fine structure) measurement.
For example, it can be performed under the following conditions.

XAFS Measurement
Si K-edge (K absorption edge)
Measurement site: BL6N1 in Aichi Synchrotron Radiation Center
Accelerating energy of 1.2 GeV,
Accumulated current value of 300 mA
Monochromatic condition: white X-ray from a bending magnet is made monochromatic with a 2-crystal spectroscope and utilized for the measurement
Focusing condition: focusing in vertical and horizontal directions with Ni-coated bending cylindrical mirror
Upstream slit opening: 7.0 mm in a horizontal direction× 3.0 mm in a vertical direction,
Beam size: 2.0 mm in a horizontal direction×1.0 mm in a vertical direction
Incident angle to sample: normal incidence (incident angle of 0°)
Energy calibration: peak position of $K_2SO_4$ at the S-K edge is calibrated to 2481.70 eV
Measurement method: all-electron yield method by measuring sample current
$I_0$ measurement method: in XANES measurement, Au-mesh
Vacuum degree of measurement bath $5 \times 10^{-7}$ Pa
Sample environment: transferred using a transfer vessel for the transportation without exposing to the atmosphere
Substances having a carboxylic acid structure can be confirmed by TOF-SIMS.
Equipment: TOF. SIMS 5 (manufactured by ION-TOF)
Primary ion: Bi3++
Secondary ion polarity: positive and negative
Mass range (m/z): 0 to 1500
Raster size: 300 μm$^2$ Number of scans: 30scan
Measurement vacuum degree: $5 \times 10^{-7}$ Pa or less (before sample introduction)
Primary ion acceleration voltage: 30 kV
Charge neutralization: None
Pulse width: 1.6 ns
Post-stage acceleration: 10 kV As the negative electrode binder contained in the negative electrode active material layer, any one or more of polymer material, synthetic rubber, and so on are usable, for example. Illustrative examples of the polymer material includes polyvinylidene fluoride, polyimide, polyamideimide, aramid, polyacrylic acid, lithium polyacrylate, and carboxymethyl cellulose. Illustrative examples of the synthetic rubber includes styrene-butadiene rubber, fluororubber, and ethylene-propylene-diene.

As the negative electrode conductive assistant agent, any one or more of a carbon material, such as carbon black, acetylene black, graphite, ketjen black, carbon nanotube, and carbon nanofiber can be used.

The negative electrode active material layer is formed by an application method, for example. The application method is a method in which a negative electrode active material particles are mixed with the above binder and so on, optionally with a conductive assistant agent or a carbon material, and then dispersed to organic solvent, water, or the like so as to be applied.

[Method of Producing Negative Electrode]

Subsequently, a method for producing the negative electrode active material of the present invention will be described.

First, silicon compound particles containing a silicon compound containing oxygen are prepared. Next, at least a part of the silicon compound particles is coated with a carbon layer. Further, Li is inserted into the silicon compound particles, and $Li_2SiO_3$ is contained in the silicon compound particles. Then, by modifying the surface of the negative electrode active material particles containing the silicon compound particles coated with the carbon layer, the surface layer of the negative electrode active material particles contains a substance having a carboxylic acid structure. A negative electrode active material is produced using the negative electrode active material particles thus produced.

Hereinafter, the case where silicon oxide represented by $SiO_x$ (0.5≤x≤1.6) is used as the silicon compound containing oxygen will be described more specifically.

First, a raw material which generates silicon oxide gas is heated at a temperature range of 900° C. to 1600° C. in a reduced pressure under an inert gas atmosphere to generate silicon oxide gas. When considering the existence of oxygen on surface of the metallic silicon powder and slight oxygen in a reaction furnace, the mixing molar ratio is desirably in a range of 0.8<metallic silicon powder/silicon dioxide powder<1.3.

The generated silicon oxide gas is solidified and deposited on an absorbing plate. Subsequently, the deposit of silicon oxide is taken out under the condition of the temperature in the reaction furnace of 100° C. or below, and then the deposit is ground and powdered using a ball mil, a jet mil, or the like. Thus obtained powder may be classified. In the present invention, the distribution of particle size of the silicon compound particles can be controlled in the pulverization step and the classification step. As described above, the silicon compound particles can be produced. It is to be noted that the Si crystallite in the silicon compound particles can be controlled by altering the vaporization temperature or heat treatment after the formation.

At this time, it is preferable to mix the metal particles with the raw material that generates silicon oxide gas. By applying heat when generating silicon oxide gas, a small amount of metal particles are vaporized due to the balance of vapor pressure, and the vaporized metal particles can be taken into the silicon compound particles. At this time, by selecting a metal having a vapor pressure lower than that of the silicon compound, the metal particles can be more reliably contained in the silicon compound particles.

On the surface layer of the silicon compound particles, a carbon material layer (carbon layer) may be formed. As a method to form the carbon material layer, a thermal decomposition CVD method is desirable. Hereinafter, an example of the method for forming a carbon material layer by thermal decomposition CVD method will be described.

First, silicon compound particles are set in a furnace. Then, a hydrocarbon gas is introduced into the furnace, and the temperature in the furnace is raised. The pyrolysis temperature is preferably, but not particularly limited to, 1200° C. or less, more preferably 950° C. or less. When the pyrolysis temperature is 1200° C. or less, it is possible to prevent unintentional disproportionation of active material particles. After raising the furnace temperature to a prescribed temperature, a carbon layer is formed onto the surface of the silicon compound particles. The hydrocarbon gas to be a raw material of the carbon material is not particularly limited, but preferably has a composition of CnHm where n≤3. When n≤3, it is possible to decrease the production cost and to improve the properties of the decomposition products.

Then, into the silicon-based active material particles produced as described above, Li is inserted, thereby bringing a Li compound to be contained. That is, as a result, the silicon compound particles are modified, and a Li compound ($Li_2SiO_3$) is generated inside the silicon compound particles. It is preferable to insert Li by a redox method.

In the modification by an oxidation and reduction method, lithium can be inserted by immersing silicon active material particles into solution-A in which lithium is dissolved into ether solvent, for example. This solution-A may also contain a polycyclic aromatic compound or a linear polyphenylene compound additionally. After inserting lithium, active lithium can be extracted from the silicon active material particles by immersing the silicon active material particles into solution-B that contains a polycyclic aromatic compound or its derivative. Illustrative examples of solvents usable for this solution-B include ether solvents, ketone solvents, ester solvents, alcohol solvents, amine solvents, and mixture thereof. The obtained silicon active material particles may be heat treated in an inert gas after being immersed to solution-A. The heat treatment allows the Li compound to be stable. This may be followed by washing with alcohol, alkaline water, weak acid, or pure water in which lithium carbonate is dissolved.

As the ether solvents used in the solution-A, diethyl ether, tert-butyl methyl ether, tetrahydrofuran, dioxane, 1,2-dimethoxy ethane, diethylene glycol dimethyl ether, triethylene glycol dimethyl ether, tetraethylene glycol dimethyl ether, or mixed solvents thereof may be used. Among these, in particular, tetrahydrofuran, dioxane and 1,2-dimethoxy ethane may be preferably used. These solvents are preferable to be dewatered and preferable to be deoxygenized.

Further, as the polycyclic aromatic compound contained in the solution-A, one or more kinds of naphthalene, anthracene, phenanthrene, naphthacene, pentacene, pyrene, picene, triphenylene, coronene, chrysene, and derivatives thereof are usable, and, as the straight chain polyphenylene compound, one or more kinds of biphenyl, terphenyl, and derivatives thereof may be used.

As the polycyclic aromatic compound contained in the solution-B, one or more kinds of naphthalene, anthracene, phenanthrene, naphthacene, pentacene, pyrene, picene, triphenylene, coronene, chrysene, and derivatives thereof may be used.

Further, as the ether solvent of the solution-B, diethyl ether, tert-butyl methyl ether, tetrahydrofuran, dioxane, 1,2-dimethoxy ethane, diethylene glycol dimethyl ether, triethylene glycol dimethyl ether, and tetraethylene glycol dimethyl ether may be used.

As the ketone solvent, acetone, acetophenone or the like may be used.

As the ester solvent, methyl formate, methyl acetate, ethyl acetate, propyl acetate, and isopropyl acetate may be used.

As the alcohol solvent, methanol, ethanol, propanol, and isopropyl alcohol may be used.

As the amine solvent, methyl amine, ethyl amine, and ethylene diamine may be used.

After the Li doping treatment by the oxidation-reduction method, the material may be filtered followed by heating at 500° C. or more and 650° C. or less to control the kind, amount (existence proportion), or the like of the Li silicate. In such control, it is important to perform the heat treatment in vacuum state or inert gas. Moreover, it is desirable to employ uniform heat treatment with such a heating apparatus as a rotary kiln, although the apparatus is not limited. In this event, various Li silicate states can be created by setting vacuum state, inert gas flow rate (inner pressure), retort thickness, and the number of revolutions as factors. Those skilled in the art can experimentally easily determine what Li silicate state is obtained under what conditions. Similarly, silicon enlargement or silicon amorphization can be controlled. Those skilled in the art can experimentally easily determine under what conditions these are controlled.

Further, a substance having a carboxylic acid structure can be produced by adhering a solvent or a polycyclic aromatic to the surface of the material after filtration and then performing a heat treatment. This product can be controlled by the polycyclic aromatic concentration in the solutions A and B, the vacuum drying conditions at the time of filtration, and the like. At this time, the production of the substance having a carboxylic acid structure can be performed at the same time as the Li silicate production.

As examples of the solvent and the polycyclic aromatic compound to be attached to the surface of the material, diglyme (diethylene glycol dimethyl ether), biphenyl, terphenyl or the like contained in the above solutions A and B can be mentioned. By heat treating and decomposing these substances after Li-doping treatment, a substance having a carboxylic acid structure can be contained on the surface of the negative electrode active material particles. For example, before the heat treatment, the material is impregnated with a linear polyphenylene compound (biphenyl, terphenyl) or diglyme in a solution having a concentration of, for example, 5% by mass or less, so that the substances are attached to the surface of the material. It can be generated by controlling the temperature rise or controlling the amount of surface adhesion. Those skilled in the art can easily obtain the temperature control conditions and the surface adhesion control conditions experimentally.

The negative electrode active material produced as described above is mixed with other materials such as a negative electrode binder and a conductive assistant agent to form a negative electrode mixture. Then, organic solvent or water is added thereto to form slurry. Subsequently, the slurry is applied onto the surface of a negative electrode collector and dried to form a negative electrode active material layer. In this case, heat pressing and so on may be performed in accordance with needs. As described above, a negative electrode is successfully produced.

As described above, as an example of the method for manufacturing a negative electrode of the present invention, $Li_2SiO_3$ is contained in silicon compound particles, a substance having a carboxylic acid structure is contained in the surface layer of the negative electrode active material particles, and the negative electrode is manufactured using the negative electrode active material particles. Although the method has been described, the method for manufacturing the negative electrode of the present invention is not limited to this. Further, the present invention provides a method for manufacturing a negative electrode as shown below.

In the method for producing a negative electrode of the present invention, first, silicon compound particles containing a silicon compound are produced, and at least a part of the produced silicon compound particles is coated with a carbon layer. A negative electrode is formed using the silicon compound particles coated with the carbon layer thus produced. Here, the method for forming the carbon layer may be the same as described above. As a method for forming the negative electrode, silicon compound particles coated with a carbon layer are mixed with other materials such as a negative electrode binder and a conductive assistant agent to form a negative electrode mixture, and then an organic solvent or water is added. Then, a slurry may be prepared, and the prepared slurry may be applied to the surface of the negative electrode current collector and dried to form a negative electrode active material layer, and if necessary, a heating press or the like may be performed.

Next, Li is inserted into the silicon compound particles contained in the negative electrode formed as described above, and $Li_2SiO_3$ is contained in the silicon compound particles. Li is preferably inserted by an oxidation-reduction method, and the negative electrode containing lithium-containing silicon compound particles can be obtained by being preferably brought into contact with solution A, which contains lithium and the solvent is an ether solvent. The details (composition, contact time, etc.) of the solution A are as described in the above-mentioned method for producing the negative electrode active material of the present invention. As described above, in the method for manufacturing a negative electrode of the present invention, the step of inserting Li can also be performed by inserting Li after the step of forming the negative electrode containing the above-mentioned silicon compound particles.

Further, the method for manufacturing a negative electrode of the present invention includes a step of making a substance having a carboxylic acid structure included the surface layer of the negative electrode active material particles, by performing surface modification to the negative electrode active material particles containing the silicon compound particles coated with the carbon layer coating contained in the negative electrode. This step can also be performed in the same manner as the method of incorporating a substance having a carboxylic acid structure in the surface layer of the negative electrode active material particles, and by using the formed negative electrode instead of the negative electrode active material particles, substance having a carboxylic acid structure can be contained in the surface layer of the negative electrode active material particles contained in the formed negative electrode.

<Lithium-Ion Secondary Battery>

Then, a lithium-ion secondary battery containing the inventive negative electrode active material will be described. Here exemplifies a lithium-ion secondary battery of a laminate film type as a concrete example.

[Configuration of Laminate Film Type Lithium-Ion Secondary Battery]

The laminate film type lithium-ion secondary battery 30 shown in FIG. 7 mainly includes a wound electrode body 31 stored in sheet-shaped outer parts 35. This wound body is formed by winding a positive electrode, a negative electrode, and a separator disposed between these electrodes. There is also a case storing a laminate having a separator disposed between a positive electrode and a negative electrode. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer may be aluminum foil, for example; the protecting layer may be nylon, for example.

The space between the outer parts 35 and the positive and negative electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector as in the negative electrode 10 shown in FIG. 6, for example.

The positive electrode current collector is made of, for example, a conductive material such as aluminum.

The positive electrode active material layer contains any one kind or two kinds or more of positive electrode materials capable of occluding and releasing lithium ions, and may contain a binder, a conductive assistant agent, a dispersing agent, or other materials according to design. The same detailed description as described for the negative electrode binders and negative electrode conductive assistant agent, for example, is then given for the binder and the conductive assistant agent.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xMlO_2$ or $Li_yM2PO_4$, where M1 and M2 represent at least one kind of transition metal elements, and "x" and "y" represent a value varied depending on a charging or discharging status of a battery, which typically satisfy $0.05 \leq x \leq 1.10$ and $0.05 \leq y \leq 1.10$.

As examples of the composite oxide having lithium and a transition metal element, a lithium cobalt composite oxide ($Li_xCoO_2$), a lithium nickel composite oxide ($Li_xNiO_2$), and a lithium nickel cobalt composite oxide can be mentioned. As examples of the lithium nickel cobalt composite oxide, lithium nickel cobalt aluminum composite oxide (NCA) and lithium nickel cobalt manganese composite oxide (NCM) can be mentioned.

Examples of the phosphate compound containing lithium and a transition metal element include a lithium iron phosphate compound ($LiFePO_4$), a lithium iron manganese phosphate compound ($LiFe_{1-u}Mn_uPO_4$ ($0<u<1$)). This is because higher battery capacity and excellent cycle characteristics are obtained using the positive electrode materials described above.

[Negative Electrode]

The negative electrode has a configuration similar to that of the above negative electrode 10 for a lithium-ion secondary battery shown in FIG. 6, and, for example, has the negative electrode active material layers 12 disposed on both faces of the current collector 11. The negative electrode preferably has a negative electrode charge capacity larger than electrical capacitance (a battery charge capacity) provided by the positive electrode active material, for this negative electrode itself can inhibit the precipitation of lithium metal.

The positive electrode active material layer is formed partially on both faces of the positive electrode current collector. The negative electrode active material layer is also formed partially on both faces of the negative electrode current collector. Such a negative electrode may have, for example, an area at which the positive electrode active material layer is not present on the surface of the positive electrode current collector that the negative electrode active material layer faces. This area permits stable battery design.

A non-facing area, that is, the above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

At least a part of the active material layers or the separator is impregnated with a liquid electrolyte (an electrolyte). This electrolyte is composed of electrolyte salt dissolved in a solvent and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. In this case, the dissociation of electrolyte salt and ionic mobility can be improved by combined use of a viscous solvent, such as ethylene carbonate or propylene carbonate, and a non-viscous solvent, such as dimethyl carbonate, ethylmethyl carbonate, or diethyl carbonate.

For an alloyed negative electrode, the solvent preferably contains at least one of halogenated chain carbonate ester and halogenated cyclic carbonate ester. Such a solvent enables the negative electrode active material to be coated with a stable coating at discharging and particularly charging. The halogenated chain carbonate ester is chain carbonate ester having halogen as a constituent element (at least one hydrogen is substituted by halogen). In addition, the halogenated cyclic carbonate ester is cyclic carbonate ester having halogen as a constituent element (that is, at least one hydrogen is substituted by halogen).

The halogen is preferably, but not limited to, fluorine, for fluorine enables the formation of better coating than other halogens do. A larger number of halogens is better, for a more stable coating can be obtained which reduces a decomposition reaction of an electrolyte.

Examples of the halogenated chain carbonate ester include fluoromethyl methyl carbonate, difluoromethyl methyl carbonate. Examples of the halogenated cyclic carbonate ester include 4-fluoro-1,3-dioxolane-2-one, 4,5-difluoro-1,3-dioxolane-2-one.

The solvent preferably contains an unsaturated carbon bond cyclic carbonate ester as an additive, for this enables the formation of a stable coating on a negative electrode at charging and discharging and the inhibition of a decomposition reaction of the electrolyte. Examples of the unsaturated carbon bond cyclic carbonate ester include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent is preferably 0.5 mol/kg or more and 2.5 mol/kg or less. This content enables high ionic conductivity.

[Method of Producing Laminate Film Type Secondary Battery]

Firstly, a positive electrode is produced with the above positive electrode material. A positive electrode mixture is created by mixing the positive electrode active material with as necessary the binder, the conductive assistant agent, and other materials, and dispersed in an organic solvent to form slurry of the positive-electrode mixture. The mixture slurry is then applied to a positive electrode current collector with a coating apparatus such as a die coater having a die head or a knife roll, and dried by hot air to obtain a positive electrode active material layer. The positive electrode active material layer is finally compressed with, for example, a roll press. In this case, heating may be performed, and the heating or the compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collector. In both the electrodes, the length of these active material layers formed on the faces may differ from one another (See FIG. 6).

Then, an electrolyte is prepared. With ultrasonic welding and so on, the positive electrode lead 32 is attached to the positive electrode current collector and the negative-electrode lead 33 is attached to the negative electrode current collector. The positive and negative electrodes and the separator interposed therebetween are stacked or wound to produce the wound electrode body 31 and a protecting tape is stuck to the outermost circumference of the body. The electrode body is flattened. The film-shaped outer part 35 is folded in half to interpose the electrode body therebetween. The insulating portions of the outer part are stuck to one another by heat sealing, thereby the wound electrode body is encapsulated with one direction is released. The close adhesion films are inserted between the outer part and the positive and negative electrode leads. The prepared electrolyte is introduced from the released side in a prescribed amount to perform the impregnation of the electrolyte under a vacuum. After the impregnation, the released side is stuck by vacuum heat sealing. In this manner, the laminate film type lithium-ion secondary battery 30 is successfully produced.

EXAMPLE

Hereinafter, the present invention will be more specifically described by showing Examples of the present invention and Comparative Examples, but the present invention is not limited to these Examples.

Example 1-1

First, a negative electrode active material was produced by the following procedure. A mixed raw material of metallic silicon and silicon dioxide was introduced into a reaction furnace and evaporated under a vacuum atmosphere of 10 Pa to deposit the evaporated material on an adsorption plate. The deposit was sufficiently cooled and then taken out to pulverize the deposit with a ball mill. In thus obtained silicon compound particles, the value of "x" in $SiO_x$ was 1.0. The silicon compound particles were classified to adjust the particle sizes. Then, thermal decomposition CVD was performed to coat the silicon compound particles with carbon material.

Subsequently, the silicon compound particles were modified through lithium insertion by the oxidation-reduction method. Then, the resultant was heated in a range of 450° C. to 750° C. for the modification. At this time, Li silicate was stabilized by gently doping Li and controlling the heating rate and the rotation speed of the rotary kiln. Further, at the time of inserting lithium and before modification by heating, a solution of 5% by mass of linear polyphenylene containing 3% by mass of biphenyl was used as the above solution B and attached to the surface of the silicon compound particles. Then, along with the modification by heating, a substance having a carboxylic acid structure was generated on the surface layer of the silicon compound particles.

The particle size of the negative electrode active material particles thus obtained and the thickness of the carbon film were measured. In addition, the obtained negative electrode active material particles were measured by TOF-SIMS to confirm the presence or absence of a carboxylic acid structure and the peak intensity. In addition, the presence or absence of $Li_2SiO_3$ was confirmed by $^{29}Si$-MAS-NMR. Further, TEM measurement was performed and elemental analysis was performed using EDX.

Next, the prepared negative electrode active material, graphite, conductive assistant agent 1 (carbon nanotube, CNT), conductive assistant agent 2 (carbon fine particles having a median diameter of about 50 nm), sodium polyacrylate, and carboxymethyl cellulose (hereinafter, referred to as CMC) were mixed at a dry mass ratio of 18.6:74.4:1: 1:4:1, the mixture was diluted with pure water to prepare a negative electrode mixture slurry.

As the negative electrode current collector, an electrolytic copper foil with a thickness of 15 µm was used. This electrolytic copper foil contained each 70 ppm by mass of carbon and sulfur. Finally, the negative electrode mixture slurry was applied onto the negative electrode current collector, and subjected to drying at 100° C. for 1 hour under a vacuum. The negative electrode active material layer was deposited in a deposited amount per unit area on a face of the negative electrode after drying (referred to as an area density) of 7.0 mg/cm².

Subsequently, ethylene carbonate (EC), and dimethyl carbonate (DMC)) were mixed, followed by dissolving electrolyte salt (lithium hexafluorophosphate ($LiPF_6$)) to prepare an electrolytic solution. In this case, the solvent composition was set to EC:DMC=30:70 in a volume ratio, and the content of the electrolyte salt was set to 1 mol/kg based on the solvent. As additives, vinylene carbonate (VC) and fluoroethylene carbonate (FEC) were added in an amount of 1.0% by mass and 2.0% by mass, respectively.

Next, the coin battery was assembled as follows. First, a Li foil having a thickness of 1 mm was punched to a diameter of 16 mm and attached to an aluminum clad. The obtained negative electrode was punched to a diameter of 15 mm, faced with a Li foil via a separator, and an electrolyte was injected to prepare a 2032 coin battery.

The initial efficiency was measured under the following conditions.

First, the charge rate was set approximately at 0.03 C. In this case, the charging was performed at CCCV mode. The CV was 0 V, and the end current was 0.04 mA.

CC discharge was carried out by setting the discharge rate at 0.03 C, also. The discharge voltage was 1.2 V.

To investigate the first charge-discharge characteristics, a first efficiency (hereinafter, also referred to as an initial efficiency) was calculated. The first efficiency was calculated from the expression shown by First Efficiency (%)= (First Discharge Capacity/First Charge Capacity)×100.

In addition, from the initial data obtained above, the positive electrode of the laminated film type secondary battery was designed and the battery was evaluated (evaluation of cycle characteristics).

The design of the positive electrode of the laminated film type secondary battery was performed as follows. First, the positive electrode was charged and discharged with the counter electrode as Li, and the positive electrode capacity was determined. The charging potential was set to 4.35V, which is 50 mV higher than the charging potential (4.3V) of the cell used for evaluating the cycle characteristics, and the discharge voltage was set to 2.5V. Then, using the negative electrode data when the initial charge-discharge characteristics were investigated and the initial data at the time of charging/discharging the positive electrode, the value of the formula represented below was calculated, 100×((positive electrode capacity)−(irreversible capacity of the negative electrode))/(reversible capacity of the negative electrode), and the value was designed to have a positive electrode area density in the range of 90% to 95% (the amount of the positive electrode active material layer deposited per unit area of the positive electrode after drying).

Further, the positive electrode active material is 95 parts by mass of $LiCoO_2$, which is a lithium cobalt composite oxide, 2.5 parts by mass of a positive electrode conductive assistant agent (acetylene black), and 2.5 parts by mass of a positive electrode binder (polyfluorinated vinylidene: Pvdf) were mixed to obtain a positive electrode mixture. Subsequently, the positive electrode mixture was dispersed in an organic solvent (N-methyl-2-pyrrolidone: NMP) to obtain a paste-like slurry. Subsequently, the slurry was applied to both sides of the positive electrode current collector with a coating device having a die head, and dried with a hot air type drying device. Finally, compression molding was performed with a roll press.

As the negative electrode, one prepared by the same procedure as the electrode containing the silicon-based active material of the above test cell was used.

As the electrolyte, one prepared by the same procedure as the electrolyte of the above test cell was used.

Then, a secondary battery was assembled as follows. First, an aluminum lead was attached to one end of the positive electrode current collector with ultrasonic welding, and a nickel lead was welded to one end of the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film of 12 μm in which a film mainly composed of porous polyethylene was sandwiched by films mainly composed of porous polypropylene. Then, the electrode body was put between outer parts, and then peripheries excluding one side are hot melted, and thereby the electrode body was stored in the outer parts. The outer part was an aluminum laminate film in which a nylon film, an aluminum foil, and a polypropylene film were laminated. Then, the electrolyte was introduced from the open side to perform the impregnation under a vacuum. The open side was then stuck by heat sealing.

The cycle characteristics (retention rate %) of the laminated film type lithium-ion secondary battery thus produced were investigated.

The cycle characteristics were investigated as follows. First, for battery stabilization, two cycles of charging and discharging were performed at 0.2 C in an atmosphere of 25° C., and the discharge capacity of the second cycle was measured. The battery cycle characteristics were calculated from the discharge capacity of the third cycle, and the battery test was stopped at the number of cycles in which the capacity retention rate was 80% or less. Here, the measured discharge capacity was divided by the discharge capacity of the second cycle to calculate the capacity retention rate of each cycle (hereinafter, also simply referred to as the retention rate). Further, from the normal cycle, that is, from the third cycle, charging/discharging was performed with charging 0.7 C and discharging 0.5 C. The charging voltage was 4.3V, the discharge termination voltage was 2.5V, and the charging termination rate was 0.07 C. Silicon oxide is accompanied by a significant decrease in capacity at the beginning of the cycle. Therefore, the retention rate at the 100th cycle was calculated.

Further, the stabilization of Li silicate was performed by charging/discharging with a coin cell in which a negative electrode and a lithium metal were combined and confirming the XANES spectrum by XAFS measurement, as in the case of examining the initial charge-discharge characteristics. For charging and discharging, charging was performed in the CCCV mode with a CV of 0 V, which corresponds to a full charge, and CC discharge was performed with a final voltage of 2.5 V, which corresponds to a complete discharge. Here, the XAFS measurement was performed on the negative electrode taken out from the secondary battery after charging and the negative electrode taken out from the secondary battery after the secondary battery after charging was completely discharged. The measurement conditions for XAFS measurement are the same as above.

Example 1-2

By setting the concentration of biphenyl in the solution B used at the time of lithium insertion to 5% by mass, increasing the concentration of biphenyl in the solution, and increasing the residual liquid content during filtration, the amount of the coating of the substance having a carboxylic acid structure after heat treatment was changed. Other than that, the same procedure as in Example 1-1 was performed. Since it was difficult to quantify the coating amount of a substance having a carboxylic acid structure, it was decided to express the increase/decrease based on the peak intensity by TOF-SIMS.

Example 1-3

The procedure was the same as in Example 1-1 except that the amount of lithium doping was increased from that in Example 1-1.

Example 1-4

The same procedure as in Example 1-1 was carried out except that the metal component was not mixed as a raw material for producing the silicon compound particles.

Examples 2-1 to 2-5

The negative electrode active material was produced in the same manner as in Example 1-1 except that the thickness of the carbon layer was changed.

Examples 3-1 to 3-6

The negative electrode active material was produced in the same manner as in Example 1-1, except that the particle size of the negative electrode active material particles was changed.

Comparative Example 1

Mn particles were not mixed with the raw material for producing silicon compound particles, and Li doping was not performed. In addition, a substance having a carboxylic acid structure was not generated on the surface layer of the silicon compound particles. Except for them, the procedure was the same as in Example 1-1.

Comparative Example 2

After coating the silicon compound particles with a carbon material, lithium was inserted into the silicon compound particles by a redox method and modified. Then, it was carried out in the same manner as in Comparative Example 1 except that it was modified by heating in a range of 450° C. to 750° C. At this time, the Li doping rate was faster than that of Example 1-1, the temperature rising rate during the heat treatment was increased, and Li silicate was generated in a shorter time.

Comparative Example 3

It was carried out in the same manner as in Example 1-4 except that the carbon coating was not performed.

Comparative Example 4

The same procedure as in Example 1-1 was carried out except that the surface layer of the negative electrode active material particles did not contain a substance having a carboxylic acid structure.

Table 1 shows the evaluation results of Examples 1-1 to 1-4, 2-1 to 2-5, 3-1 to 3-6, and Comparative Examples 1 to 4.

Table 2 shows the measurement results of Examples 1-1, 1-2, and Comparative Example 2 by TOF-SIMS. Moreover, the $^{29}$Si-MAS-NMR spectrum obtained from the negative electrode active material of Example 1-3 is shown in FIG. 4. The presence or absence of $Li_2SiO_3$ in Table 1 was confirmed by the presence or absence of a peak appearing in the vicinity of −75 ppm as shown in FIG. 4.

TABLE 1

| | Retention rate at the 100th cycle | First time efficiency (%) | Particle size (μm) | $Li_2SiO_3$ confirmed by NMR | Li silicate decomposition | Carboxylic acid structure | Metal component | Carbon coating layer thickness (nm) |
|---|---|---|---|---|---|---|---|---|
| Comparative Example 1 | 88 | 68.0 | 6.5 | absent | — | absent | absent | 50 |
| Comparative Example 2 | 90.5 | 85.0 | 6.5 | $Li_2SiO_3$ present | decomposed | absent | absent | 50 |
| Example 1-1 | 93.6 | 85.0 | 6.5 | $Li_2SiO_3$ present | stable | present (middle) | present | 50 |
| Example 1-2 | 93.5 | 85.1 | 6.5 | $Li_2SiO_3$ present | stable | present (many) | present | 50 |
| Example 1-3 | 93.6 | 90.1 | 6.5 | $Li_2SiO_3$ present | stable | Present (more) | present | 50 |
| Example 1-4 | 92.8 | 85.0 | 6.5 | $Li_2SiO_3$ present | stable | Present (middle) | absent | 50 |
| Comparative Example 3 | 88.1 | 84.1 | 6.5 | $Li_2SiO_3$ present | stable | Present (middle) | present | 0 |
| Example 2-1 | 92.8 | 85.0 | 6.5 | $Li_2SiO_3$ present | stable | Present (middle) | present | 5 |
| Example 2-2 | 93.4 | 85.0 | 6.5 | $Li_2SiO_3$ present | stable | Present (middle) | present | 100 |
| Example 2-3 | 93.6 | 85.0 | 6.5 | $Li_2SiO_3$ present | stable | Present (middle) | present | 200 |
| Example 2-4 | 93.5 | 85.0 | 6.5 | $Li_2SiO_3$ present | stable | Present (middle) | present | 500 |
| Example 2-5 | 92.6 | 85.0 | 6.5 | $Li_2SiO_3$ present | stable | Present (middle) | present | 1000 |
| Example 3-1 | 92.2 | 84.5 | 2 | $Li_2SiO_3$ present | Stable | Present (middle) | present | 50 |
| Example 3-2 | 93.5 | 85.0 | 4 | $Li_2SiO_3$ present | stable | Present (middle) | present | 50 |
| Example 3-3 | 93.6 | 85.1 | 8 | $Li_2SiO_3$ present | stable | Present (middle) | present | 50 |
| Example 3-4 | 93.5 | 85.3 | 10 | $Li_2SiO_3$ present | stable | Present (middle) | present | 50 |
| Example 3-5 | 93.6 | 85.3 | 12 | $Li_2SiO_3$ present | stable | Present (middle) | present | 50 |
| Example 3-6 | 91.8 | 85.2 | 15 | $Li_2SiO_3$ present | stable | Present (middle) | present | 50 |
| Comparative Example 4 | 90.5 | 85.0 | 6.5 | $Li_2SiO_3$ present | stable | absent | absent | 50 |

TABLE 2

| Fragment | Example 1-1 | Example 1-2 | Comparative Example 2 |
|---|---|---|---|
| $C_6^-$ | 0.007466 | 0.000176 | 0.014757 |
| $C_6H^-$ | 0.007979 | 0.000480 | 0.015477 |
| $C_2^-$ | 0.091956 | 0.004081 | 0.179831 |
| $C_2H^-$ | 0.102158 | 0.007962 | 0.196354 |
| $CNO^-$ | 0.005124 | 0.009286 | 0.000961 |
| $C_2H_3O^-$ | 0.000611 | 0.000982 | 0.000241 |
| $CHO_2^-$ | 0.005362 | 0.009139 | 0.001586 |
| $C_2H_3O_2^-$ | 0.001645 | 0.002998 | 0.000292 |

FIG. 2 shows the battery cycle characteristics of Examples 1-1, 1-2, 3-3, and Comparative Examples 1 and 2. Further, FIG. 3 shows the results of analysis of the changes in Li silicate with charge-discharge in Examples 1-1 and Comparative Example 2 by the XAFS method. From Table 1 and FIG. 2, it can be seen that Comparative Example 1, which is a Li-undoped product, has a low initial efficiency of 68% and a large decrease in capacity at the initial stage of the cycle. In Comparative Example 2, the initial efficiency is improved and Li silicate is generated inside the particles as compared with Comparative Example 1, but as shown in FIG. 3, the position of the peak of the XANES spectrum exists in the vicinity of 1845.5 eV after charging and discharging changed significantly, and the decomposition of Li silicate with charge and discharge was confirmed. As a result, it was confirmed that the capacity reduction rate up to 100 cycles was improved, but it was not sufficient. On the other hand, in Example 1-1, as shown in FIG. 3, the position of the peak of $Li_2SiO_3$ existing in the vicinity of 1845.3 eV after charging and discharging did not change, and stable Li silicate was generated inside the particles. Example 1-1 having such a stable Li silicate showed better cycle characteristics than Comparative Examples 1 and 2.

Further, when Example 1-1 and Example 1-3 were compared, Example 1-3 showed a better retention rate and initial efficiency, and it turned out that a larger amount of Li silicate had better battery characteristics.

Further, as shown in FIG. 3, in Example 1-1, the spectral intensity of $Si^{x+}$ ($0<x<4$) in the XANES spectrum of the negative electrode after charging was higher than that of the negative electrode after discharging. In the XANES spectrum of the negative electrode, the spectral intensity of $Si^{x+}$ ($2 \leq x<4$) (near 1844 to 1846 eV) was higher than the spectral intensity of $Si^{x+}$ ($0<x<2$) (near 1842 to 1844 eV). This indicated that the high valence Si compounds of $Si^{2+}$ and $Si^{3+}$ contributed to charging and discharging as the main active material, and such a negative electrode active material exhibited more stable battery characteristics. On the other hand, in Comparative Example 2, considering the spectral change due to the decomposition of Li silicate, there was no substantial change in the $Si^{x+}$ ($0<x<4$) spectral intensity after charging and after discharging, and as shown in Table 1 and FIG. 2, the battery characteristics were not favorable.

FIG. 1 shows the results of TOF-SIMS analysis of the surface layer portion of the negative electrode active material particles of Examples 1-1, 1-2 and Comparative Example 2. As shown in FIG. 1 and Table 2, in Comparative Example 2, fragments ($CHO_2^-$, $C_2H_3O_2^-$, etc.) derived from a substance having a carboxylic acid structure were hardly detected, but in Examples 1-1 and 1-2, it was found that they were sufficiently detected and that the surface layer of the negative electrode active material particles contained a substance having a carboxylic acid structure. Further, when the fragments by TOF-SIMS were confirmed, there were more fragments derived from the substance having a carboxylic acid structure in Example 1-2 than in Example 1-1, and it was found that it was possible to control the peak of $CHO_2^-$, which was attributed to the carboxylic acid, depending on the polycyclic aromatics concentration in the solution at the time of Li doping and the amount of residual liquid during filtration. Here, the content of the substance having the carboxylic acid structure of Example 1-2 was increased with respect to Example 1-1, but it could be adjusted by going through a step of vacuum drying, reduction of the polycyclic aromatic concentration, and vaporizing above the boiling point of the aromatic polycyclic during heat treatment, when it was decreased. In addition, it was confirmed that a part of the surface layer of the above was coated with a substance having a carboxylic acid, since the number of fragments derived from a substance having a carboxylic acid increases, and the number of C-based fragments ($C_6^-$, $C_6H^-$, $C_2^-$, $C_2H^-$, etc.) attributable to the carbon layer decreases.

Further, from Table 1, as Examples 1-1 to 1-4 containing a substance having a carboxylic acid structure in the surface layer of the negative electrode active material particles had a higher capacity than Comparative Examples 1, 2 and 4 not containing them, it was found that the retention rate and the initial efficiency were improved, and in particular, the larger the amount of the substance having a carboxylic acid structure, the higher the initial efficiency (see Examples 1-1 and 1-2).

Further, from the results of Comparative Example 3 and Examples 2-1 to 2-5 shown in Table 1, it was found that the retention rate and the initial efficiency were both better when the carbon layer was present. The carbon layer is necessary to obtain conductivity, and in the absence of the carbon layer, the electron path associated with charging and discharging is easily broken, and as a result, the capacity decrease at the initial stage of the cycle occurs due to the active material layer structure. Further, from the results of Examples 2-1 to 2-5, when the carbon layer is increased, it does not improve further, and there is no particular big difference. However, if the number of carbon layers is too large, the amount of carbon components that do not contribute to charging and discharging increases, and the theoretical capacity of the active material decreases. From these results, the average thickness of the carbon layer is preferably 5 nm or more and 500 nm or less.

Further, from the results of Examples 3-1 to 3-5, it was found that the long-term cycle characteristics could be improved by increasing the particle size of the negative electrode active material particles. This is because it is possible to suppress the reaction with the electrolyte by reducing the surface area per unit volume. However, as in Example 3-6, it was confirmed that when the particle size was larger than 12 μm, the particles were destroyed by charging and discharging, and the resulting characteristics were deteriorated. From these results, the particle size of the negative electrode active material particles is preferably 4.0 μm or more and 12 μm or less.

FIG. 5 shows the results of TEM measurement of the state of the metal scattered inside the negative electrode active material particles of Example 1-1. As can be seen from FIG. 5, it can be seen that Mn particles are contained in the portion of the carbon layer having a large amount of carbon components.

Further, from the results of Examples 1-1 and 1-4, the retention rate of Example 1-1 having a metal component inside the silicon compound particles was better. As described above, it was found that the conductivity could be imparted by interspersing the metal components inside the particles, which leads to the improvement of the battery characteristics.

The present invention is not limited to the above embodiment. The above-described embodiment is an example, and any of the above-described embodiments having substantially the same configuration as the technical idea described in the claims of the present invention and having the same effect and effect is the present invention. Is included in the technical scope of the present invention.

The invention claimed is:

1. A negative electrode active material comprising negative electrode active material particles,
    wherein the negative electrode active material particles contain silicon compound particles containing a silicon compound,
    the silicon compound particles contain $Li_2SiO_3$,
    at least a part of a surface of the silicon compound particles is covered with a carbon layer, and
    a surface layer of the negative electrode active material particles contains a substance having a carboxylic acid structure,
    wherein the negative electrode active material particles are that in which a negative fragment derived from a carboxylic acid structure is detected by measurement by TOF-SIMS,
    wherein a spectral intensity of $Si^{x+}$ (0<x<4) of a negative electrode containing the negative electrode active material after charging is higher than that of the negative electrode after discharging in a spectrum of K absorption edge XANES of Si obtained from the XAFS measurement of the negative electrode taken out from a charged secondary battery, and the negative electrode taken out from the charged secondary battery after complete discharge, and
    wherein the XANES spectrum of the negative electrode after the charge spectral intensity of $Si^{x+}$ (2≤x<4) is higher than spectral intensity of $Si^{x+}$ (0<x<2).

2. The negative electrode active material according to claim 1, wherein the silicon compound particles contain metal particles, the metal particles having an average size of 10 nm or less, inside the silicon compound particles.

3. The negative electrode active material according to claim 2, wherein the metal particles have a vapor pressure lower than that of the silicon compound.

4. The negative electrode active material according to claim 1, wherein the negative electrode active material particles have a median diameter of 4.0 μm or more and 12 μm or less.

5. The negative electrode active material according to claim 1, wherein the average thickness of the carbon layer is 5 nm or more and 500 nm or less.

6. A negative electrode comprising the negative electrode active material according to claim 1.

7. A method for producing a negative electrode active material containing negative electrode active material particles comprising the steps of:
    producing silicon compound particles containing a silicon compound,
    coating at least a part of the silicon compound particles with a carbon layer,
    inserting Li into the silicon compound particles to make the silicon compound particles contain $Li_2SiO_3$, and
    making a surface layer of the negative electrode active material particles contain a substance having a carboxylic acid structure by performing surface modification of the negative electrode active material particles containing the silicon compound particles coated with the carbon layer,
    wherein the negative electrode active material particles are that in which a negative fragment derived from a carboxylic acid structure is detected by measurement by TOF-SIMS,
    wherein a spectral intensity of $Si^{x+}$ (0<x<4) of a negative electrode containing the negative electrode active material after charging is higher than that of the negative electrode after discharging in a spectrum of K absorption edge XANES of Si obtained from the XAFS measurement of the negative electrode taken out from a charged secondary battery, and the negative electrode taken out from the charged secondary battery after complete discharge, and
    wherein the XANES spectrum of the negative electrode after the charge spectral intensity of $Si^{x+}$ (2≤x<4) is higher than spectral intensity of $Si^{x+}$ (0<x<2).

8. A method for producing a negative electrode containing negative electrode active material particles comprising the steps of:
    producing silicon compound particles containing a silicon compound,
    coating at least a part of the silicon compound particles with a carbon layer,
    forming a negative electrode containing the silicon compound particles coated with the carbon layer,
    inserting Li into the silicon compound particles contained in the formed negative electrode and making the silicon compound particles contain $Li_2SiO_3$, and
    making a surface layer of the negative electrode active material particles contained in the negative electrode contain a substance having a carboxylic acid structure by performing surface modification of the negative electrode active material particles containing the silicon compound particles coated with the carbon layer,
    wherein the negative electrode active material particles are that in which a negative fragment derived from a carboxylic acid structure is detected by measurement by TOF-SIMS,
    wherein a spectral intensity of $Si^{x+}$ (0<x<4) of a negative electrode containing the negative electrode active material after charging is higher than that of the negative electrode after discharging in a spectrum of K absorption edge XANES of Si obtained from the XAFS measurement of the negative electrode taken out from a charged secondary battery, and the negative electrode taken out from the charged secondary battery after complete discharge, and
    wherein the XANES spectrum of the negative electrode after the charge spectral intensity of $Si^{x+}$ (2≤x<4) is higher than spectral intensity of $Si^{x+}$ (0<x<2).

* * * * *